(12) United States Patent
Imahori et al.

(10) Patent No.: US 9,920,214 B2
(45) Date of Patent: Mar. 20, 2018

(54) SOLVENT-BASED PAINT COMPOSITION AND FLUORINE-CONTAINING COPOLYMER

(75) Inventors: Yuji Imahori, Osaka (JP); Hirotoshi Yoshida, Settsu (JP); Mayumi Iida, Settsu (JP); Kengo Ito, Settsu (JP); Yoshito Tanaka, Settsu (JP); Katsuhiko Imoto, Settsu (JP); Takuma Kawabe, Settsu (JP); Akiko Ohya, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/008,259

(22) PCT Filed: Mar. 30, 2012

(86) PCT No.: PCT/JP2012/058691
§ 371 (c)(1),
(2), (4) Date: Sep. 27, 2013

(87) PCT Pub. No.: WO2012/133828
PCT Pub. Date: Oct. 4, 2012

(65) Prior Publication Data
US 2014/0018492 A1 Jan. 16, 2014

(30) Foreign Application Priority Data

Mar. 31, 2011 (JP) ................................ 2011-078037
Jan. 31, 2012 (JP) ................................ 2012-019269

(51) Int. Cl.
| C09D 127/18 | (2006.01) |
| C09D 127/12 | (2006.01) |
| C08F 214/18 | (2006.01) |
| C09D 131/04 | (2006.01) |
| C08F 214/26 | (2006.01) |
| C08F 218/08 | (2006.01) |
| C08F 220/64 | (2006.01) |
| C08F 216/14 | (2006.01) |

(52) U.S. Cl.
CPC .......... C09D 127/18 (2013.01); C08F 214/18 (2013.01); C08F 214/186 (2013.01); C08F 214/267 (2013.01); C08F 218/08 (2013.01); C09D 127/12 (2013.01); C09D 131/04 (2013.01); C08F 216/1416 (2013.01); C08F 220/64 (2013.01)

(58) Field of Classification Search
CPC . C08F 214/267; C08F 214/186; C09D 131/04
See application file for complete search history.

(56) References Cited

U.S. PATENT DOCUMENTS

| 4,345,057 | A |  | 8/1982 | Yamabe et al. |  |
| 4,640,966 | A |  | 2/1987 | Mitani et al. |  |
| 4,954,589 | A | * | 9/1990 | Sugawara | C08F 214/186 526/249 |
| 5,070,162 | A | * | 12/1991 | Oxenrider et al. | 526/216 |
| 5,194,543 | A | * | 3/1993 | Schlipf | C08F 214/186 428/522 |
| 2008/0015298 | A1 | * | 1/2008 | Xiong | C08K 3/22 524/432 |
| 2009/0239993 | A1 |  | 9/2009 | Sumi et al. |  |
| 2009/0306284 | A1 | * | 12/2009 | Reiners et al. | 524/590 |

FOREIGN PATENT DOCUMENTS

| CN | 1244556 A |  | 2/2000 |  |
| CN | 101368018 A | * | 2/2009 |  |
| JP | 57-34107 A |  | 2/1982 |  |
| JP | 61-257311 A |  | 12/1986 |  |
| JP | 61-275311 A |  | 12/1986 |  |
| JP | 62-007767 A |  | 1/1987 |  |
| JP | 03-121107 A |  | 5/1991 |  |
| JP | 04-342707 A |  | 11/1992 |  |
| JP | 06-184243 A |  | 7/1994 |  |
| JP | 07-188604 A |  | 7/1995 |  |
| JP | 7-188604 A |  | 7/1995 |  |
| JP | 08-283616 A |  | 10/1996 |  |
| JP | 8-283616 A |  | 10/1996 |  |
| JP | 2004-204205 A |  | 7/2004 |  |
| JP | 2005162994 A | * | 6/2005 |  |
| TW | 200835755 A |  | 9/2008 |  |
| WO | WO 03106516 A1 | * | 12/2003 | .......... C08F 214/265 |
| WO | 2012/133836 A1 |  | 10/2012 |  |

OTHER PUBLICATIONS

ProQuest machine translation of JP 2005162994 A, Apr. 2015.*
ProQuest machine translation of CN 101368018 A, Nov. 2016.*
International Search Report for PCT/JP2012/058691 dated Jun. 26, 2012.
English Translation of International Preliminary Report on Patentability and Written Opinion of the International Searching Authority for PCT Appln. No. PCT/JP2012/058691 dated Oct. 8, 2013.
English Translation of the International Search Report for PCT Appln. No. PCT/JP2012/058704 dated Jun. 26, 2012.
English Translation of the International Preliminary Report on Patentability and Written Opinion of the International Searching Authority for PCT Appln. No. PCT/JP2012/058704 dated Oct. 8, 2013.

* cited by examiner

*Primary Examiner* — Nicole M Buie-Hatcher
(74) *Attorney, Agent, or Firm* — Sughrue Mion, PLLC

(57) ABSTRACT

Provided is a paint composition which can give a coating having excellent stretchability and further having excellent contamination resistance. A solvent-based paint composition comprises a fluorocopolymer (I), and an organic solvent (II), the fluorocopolymer (I) including: a perhaloolefin structural unit (a) that contains two carbon atoms, a vinyl acetate structural unit (b), a hydroxyl group-containing vinyl monomer structural unit (c) represented by the following formula (1): $CH_2=CH-O-(CH_2)_n-OH$ wherein n is an integer of 2 or more, and a carboxyl group-containing monomer structural unit (d) represented by the following formula (2): $R^1R^2C=CR^3-(CH_2)_m-COOH$ wherein $R^1$, $R^2$, and $R^3$ are the same as or different from one another, and each a hydrogen atom or a C1-C10 linear or branched alkyl group; and m is an integer of 2 or more.

6 Claims, 4 Drawing Sheets

SOLVENT-BASED PAINT COMPOSITION AND FLUORINE-CONTAINING COPOLYMER

CROSS REFERENCE TO RELATED APPLICATIONS

This application is a National Stage of International Application No. PCT/JP2012/058691 filed Mar. 30, 2012, claiming priority based on Japanese Patent Application Nos. 2011-078037 filed Mar. 31, 2011 and 2012-019269 filed Jan. 31, 2012, the contents of all of which are incorporated herein by reference in their entirety.

TECHNICAL FIELD

The present invention relates to a solvent-based paint composition and a novel fluorocopolymer which provide a coating having excellent stretchability and antifouling properties.

BACKGROUND ART

Fluorocopolymers have excellent weather resistance, chemical resistance, water and oil repellency, and contamination resistance because of its intermolecular C—F bond with high bonding energy and low polarizability. Owing to such properties, fluorocopolymers have been conventionally used for various purposes. In addition, fluororesin coating materials that are soluble with common organic solvents and cross-linkable at room temperature were developed. For example, Patent Literature 1 discloses copolymers of a fluoroolefin, an alkyl vinyl ether, and a hydroxy alkyl vinyl ether, as coating material resins with weather resistance. Further, Patent Literature 2 discloses copolymers of fluoroolefins, a vinyl ester, an alkyl vinyl ether, and a hydroxy alkyl vinyl ether. Further, Patent Literature 3 discloses copolymers formed of a fluoroolefin, a vinyl ester such as vinyl versatate, a hydroxy alkyl vinyl ether, and an unsaturated carboxylic acid such as crotonic acid.

CITATION LIST

Patent Literature

Patent Literature 1: JP 57-34107 A
Patent Literature 2: JP 61-275311 A
Patent Literature 3: JP 2004-204205 A

SUMMARY OF INVENTION

Technical Problem

More and more fields require use of a coating with stretchability. For example, PC (precoat) plates need to have sufficient stretchability at the time of post processing.

As a result of the examination, the present inventors have found that combination of specific monomers provides a coating with stretchability and improved antifouling properties. Thereby, the present invention has been completed.

Solution to Problem

That is, the present invention relates to a solvent-based paint composition, comprising:
a fluorocopolymer (I), and
an organic solvent (II), the fluorocopolymer (I) including:
a perhaloolefin structural unit (a) that contains two carbon atoms,
a vinyl acetate structural unit (b),
a hydroxyl group-containing vinyl monomer structural unit (c) represented by the following formula (1):

$$CH_2=CH-O-(CH_2)_n-OH$$

wherein n is an integer of 2 or more, and
a carboxyl group-containing monomer structural unit (d) represented by the following formula (2):

$$R^1R^2C=CR^3-(CH_2)_m-COOH$$

wherein $R^1$, $R^2$, and $R^3$ are the same as or different from one another, and each a hydrogen atom or a C1-C10 linear or branched alkyl group; and m is an integer of 2 or more.

The hydroxyl group-containing vinyl monomer represented by the formula (1) is preferably one in which n is 2 or 4, and the carboxyl group-containing vinyl monomer represented by the formula (2) is preferably one in which m is 2 to 20.

The fluorocopolymer preferably includes 40 mol % or more and 50 mol % or less of the structural unit (a), 20 mol % or more and 54.9 mol % or less of the structural unit (b), 5 mol % or more and 14 mol % or less of the structural unit (c), and 0.1 mol % or more and 5 mol % or less of the structural unit (d), and further includes 0 mol % or more and 25 mol % or less of a monomer structural unit (e).

The fluorocopolymer (I) may include a perhaloolefin structural unit (a) that contains two carbon atoms; a vinyl acetate structural unit (b); a hydroxyl group-containing vinyl monomer structural unit (c) represented by the following formula (1):

$$CH_2=CH-O-(CH_2)_n-OH$$

wherein n is an integer of 2 or more; a carboxyl group-containing monomer structural unit (d) represented by the following formula (2):

$$R^1R^2C=CR^3-(CH_2)_m-COOH$$

wherein $R^1$, $R^2$, and $R^3$ are the same as or different from one another, and each a hydrogen atom or a C1-C10 linear or branched alkyl group; and m is an integer of 2 or more; and a monomer structural unit (e),
wherein the fluorocopolymer contains 40 mol % or more and 50 mol % or less of the structural unit (a), 20 mol % or more and 54.9 mol % or less of the structural unit (b), 5 mol % or more and 14 mol % or less of the structural unit (c), 0.1 mol % or more and 5 mol % or less of the structural unit (d), and 0 mol % or more and 25 mol % or less of the structural unit (e). Such a fluorocopolymer is a novel copolymer.

Advantageous Effects of Invention

The paint composition of the present invention can provide a coating having excellent stretchability and further having excellent contamination resistance.

DESCRIPTION OF EMBODIMENTS

Figure 1:
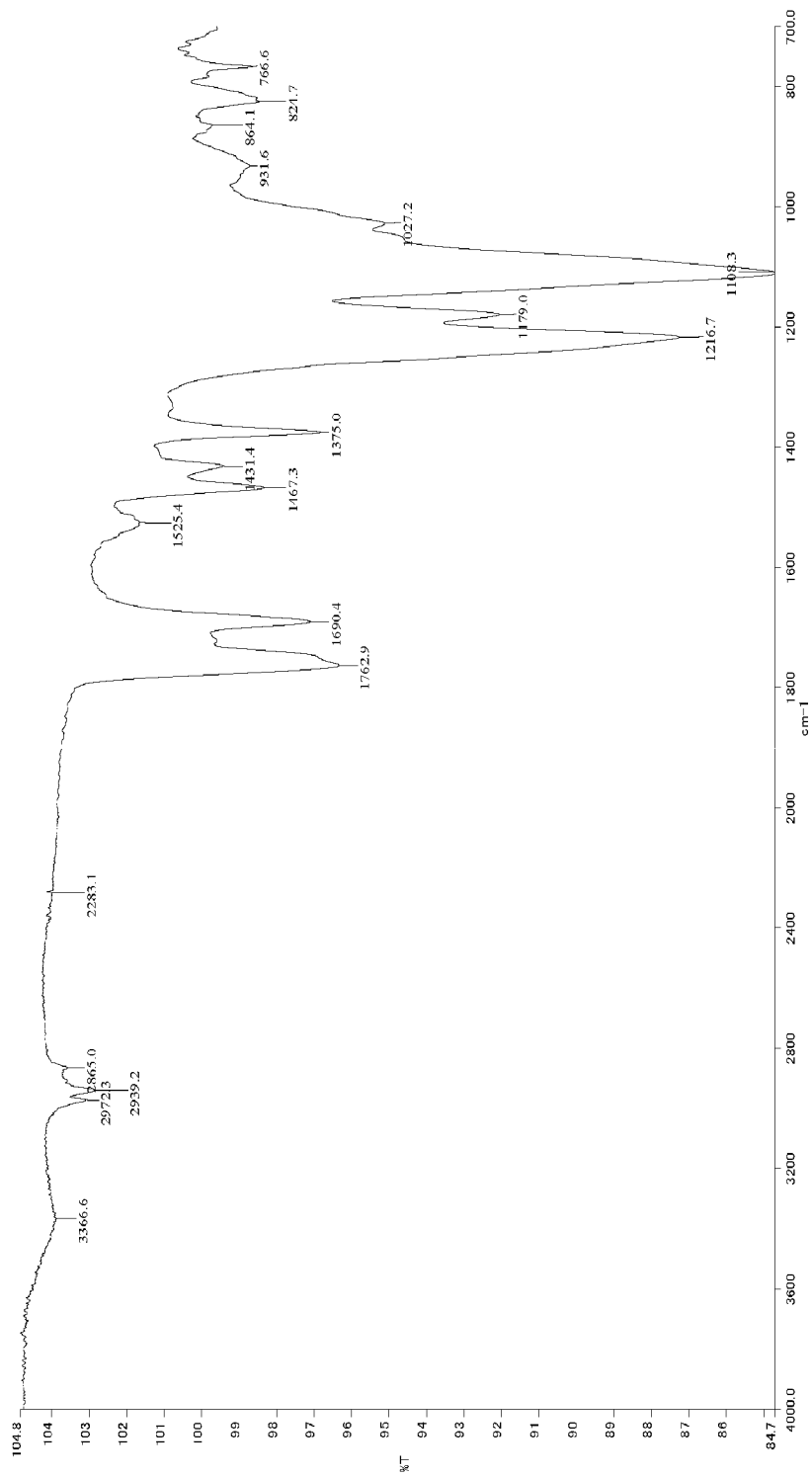
FIG. 1 is an IR chart of a fluorocopolymer produced in Example 1.

The fluorocopolymer (I) used for the solvent-based paint composition of the present invention includes a perhaloolefin structural unit (a) that contains two carbon atoms; a vinyl acetate structural unit (b); a hydroxyl group-containing vinyl monomer structural unit (c) represented by the following formula (1):

$$CH_2=CH-O-(CH_2)_n-OH$$

wherein n is an integer of 2 or more; a carboxyl group-containing monomer structural unit (d) represented by the following formula (2):

$$R^1R^2C=CR^3-(CH_2)_m-COOH$$

wherein $R^1$, $R^2$, and $R^3$ are the same as or different from one another, and each a hydrogen atom or a C1-C10 linear or branched alkyl group; and m is an integer of 2 or more; and a monomer structural unit (e).

In the present specification, the same symbol is provided to a monomer component and the corresponding monomer structural unit.

The perhaloolefin (a) that contains two carbon atoms is preferably tetrafluoroethylene (TFE) or chlorotrifluoroethylene (CTFE).

In the hydroxyl group-containing vinyl monomer (c) represented by the formula (1):

$$CH_2=CH-O-(CH_2)_n-OH$$

(in the formula, n is an integer of 2 or more), n is preferably 10 or less. Specifically, preferred is hydroxyethyl vinyl ether (HEVE) or hydroxybutyl vinyl ether (HBVE) in which n is 2 or 4.

In the carboxyl group-containing monomer (d) represented by the formula (2):

$$R^1R^2C=CR^3-(CH_2)_m-COOH$$

(in the formula, $R^1$, $R^2$, and $R^3$ are the same as or different from one another, and each a hydrogen atom or a linear or branched alkyl group containing 1 to 10 carbon atoms; and m is an integer of 2 or more), m is preferably a larger integer because a large integer m improves polymerization reactivity and compatibility with various additives. The integer m is preferably 2 or more, and more preferably 8 or more. The upper limit of m is, for example, 20.

Examples of the carboxyl group-containing monomer (d) include pentenoic acid, hexenoic acid, heptenoic acid, octenoic acid, nonenoic acid, decenoic acid, undecylenic acid, dodecenoic acid, tridecenoic acid, tetradecenoic acid, pentadecenoic acid, hexadecenoic acid, heptadecenoic acid, octadecenoic acid, nonadecenoic acid, and eicosenoic acid. Preferable among these is undecylenic acid in which m is 8 because it has good reactivity and is available at a low cost.

The monomer (e) is not particularly limited as long as it is copolymerizable with the monomers (a) to (d) and does not reduce the effects of the present invention. Specific examples of the monomer (e) are as follows.

(e1) Non-Aromatic Vinyl Ester Other than Vinyl Acetate (b)

The non-aromatic vinyl ester (e1) may be, for example, one or two or more of vinyl propionate, vinyl butyrate, vinyl isobutyrate, vinyl pivalate, vinyl caproate, vinyl versatate, vinyl laurate, vinyl stearate, and vinyl cyclohexylcarboxylate. These monomers are non-aromatic monomers free of a hydroxyl group and a carboxyl group. In cases where a paint composition is prepared using a fluorocopolymer containing such a monomer, compatibility between the copolymer and other components in the paint composition, such as an acrylic resin, a curing agent, and a dispersant, is improved. The non-aromatic vinyl ester monomer is particularly preferably vinyl versatate, vinyl laurate, vinyl stearate, or vinyl cyclohexylcarboxylate, in terms of excellent weather resistance, compatibility, and inexpensiveness. Preferred among these are carboxylic acid vinyl esters with a carboxylic acid that contains 6 or more carbon atoms, in terms of the chemical resistance. Carboxylic acid vinyl esters with a carboxylic acid that contains 9 or more carbon atoms are more preferred. The number of carbon atoms in the carboxylic acid of the carboxylic acid vinyl ester is preferably 20 or less, and more preferably 15 or less. Specifically, vinyl versatate is most preferred.

(e2) Hydroxyl Group-Containing Vinyl Monomer Other than Hydroxyl Group-Containing Vinyl Monomer (c) Represented by Formula (1)

The hydroxyl group-containing vinyl monomer (e2) may be, for example, one or two or more of 2-hydroxy-2-methylpropyl vinyl ether, 4-hydroxy-2-methylbutyl vinyl ether, 2-hydroxyethyl allyl ether, 4-hydroxybutyl allyl ether, and glycerol monoallyl ether.

(e3) Carboxyl Group-Containing Monomer Other than Carboxyl Group-Containing Monomer (d) Represented by Formula (2)

Examples of the carboxyl group-containing monomer (e3) include carboxyl group-containing vinyl monomers represented by the following formula (3):

$$R^4R^5C=CR^6-(CH_2)_p-COOH$$

(in the formula, $R^4$, $R^5$, and $R^6$ are the same as or different from one another, and each a hydrogen atom, an alkyl group, a carboxylic group, or an ester group; and p is 0 or 1) and those represented by the following formula (4):

$$CH_2=CH-(CH_2)_q-O-(R^7OCO)_r-R^8-COOH$$

(in the formula, $R^7$ and $R^8$ are the same as or different from each other, and each a saturated or unsaturated linear or cyclic alkyl group, q is 0 or 1, and r is 0 or 1).

The carboxyl group-containing vinyl monomer (e3) may be specifically, for example, one or two or more of acrylic acid, methacrylic acid, vinyl acetate, crotonic acid, cinnamic acid, 3-allyloxy propionic acid, itaconic acid, itaconic acid monoesters, maleic acid, maleic acid monoester, maleic anhydride, fumaric acid, fumaric acid monoester, vinyl phthalate, and vinyl pyromellitate.

(e4) Aromatic Group-Containing Monomer

An aromatic group-containing monomer is a monomer that contains an aromatic group but is free of a hydroxyl group and a carboxyl group. The aromatic group-containing monomer may be, for example, one or two or more of vinyl benzoate monomers such as vinyl benzoate and vinyl para-t-butyl-benzoate. Vinyl para-t-butylbenzoate is preferred, and vinyl benzoate is more preferred.

(e5) Copolymerizable Monomer

The monomer (e5) may be, for example, alkyl vinyl ethers such as methyl vinyl ether and ethyl vinyl ether; and non-fluoroolefins such as ethylene, propylene, n-butene, and isobutene.

The fluorocopolymer (I) used in the present invention preferably has a number average molecular weight of preferably 5,000 to 100,000, and more preferably 5,000 to 50,000, where the number average molecular weight is measured by gel permeation chromatography (GPC) using tetrahydrofuran as an eluent. Further, the glass transition temperature (2nd run) is measured by a differential scanning calorimeter (DSC), and is preferably 10 to 70° C., and more preferably 15 to 60° C. A paint composition including a fluorocopolymer with too small a molecular weight provides a coating with insufficient hardness, whereas a paint composition including a fluorocopolymer with too great a molecular weight becomes viscous, resulting in difficulty in handling of the paint composition.

The fluorocopolymer used in the present invention has an acid value of preferably 1 to 15 mgKOH/g in terms of good pigment dispersibility, and more preferably 2 to 12 mgKOH/g in terms of good water resistance. The fluorocopolymer preferably has a hydroxyl value of 20 to 65 mgKOH/g in terms of good solvent resistance and flexibility. The fluorocopolymer (I) including the monomer (e) also satisfies the above preferable ranges of the acid value and hydroxyl value.

The fluorine content of the fluorocopolymer used in the present invention is preferably 25% by mass or more.

The fluorocopolymer used in the present invention may be produced by solution polymerization, emulsion polymerization, suspension polymerization, or bulk polymerization, and particularly preferably produced by solution polymerization.

The fluorocopolymer (I) used in the present invention is preferably produced by polymerizing monomers that provide the above structural units by solution polymerization using an organic solvent and a polymerization initiator. The polymerization temperature is usually 0 to 150° C. and preferably 5 to 95° C. The polymerization pressure is usually 0.1 to 10 MPaG (1 to 100 kgf/cm$^2$G).

Examples of the polymerization solvent include esters such as methyl acetate, ethyl acetate, propyl acetate, and butyl acetate; ketones such as acetone, methyl ethyl ketone, and cyclohexanone; aliphatic hydrocarbons such as hexane, cyclohexane, octane, nonane, decane, undecane, dodecane, and mineral spirits; aromatic hydrocarbons such as benzene, toluene, xylene, naphthalene, and solvent naphtha; alcohols such as methanol, ethanol, tert-butanol, iso-propanol, and ethylene glycol monoalkyl ethers; cyclic ethers such as tetrahydrofuran, tetrahydropyran, and dioxane; dimethyl sulfoxide; and mixtures of these.

Examples of a usable polymerization initiator include persulfates such as ammonium persulfate and potassium persulfate (reducing agents such as sodium bisulfite, sodium pyrosulfite, cobalt naphthenate, and dimethylaniline may be further used in combination as needed); redox initiators formed from an oxidizer (such as ammonium peroxide or potassium peroxide), a reducing agent (such as sodium sulfite), and a transition metal salt (such as iron sulfate); diacyl peroxides such as acetyl peroxide and benzoyl peroxide; dialkoxy carbonyl peroxides such as isopropoxycarbonyl peroxide and tert-butoxycarbonyl peroxide; ketone peroxides such as methyl ethyl ketone peroxide and cyclohexanone peroxide; hydroperoxides such as hydrogen peroxide, tert-butyl hydroperoxide, and cumene hydroperoxide; dialkyl peroxides such as di-tert-butyl peroxide and dicumyl peroxide; alkyl peroxy esters such as tert-butyl peroxyacetate and tert-butyl peroxypivalate; and azo compounds such as 2,2'-azobisisobutyronitrile, 2,2'-azobis(2,4-dimethylvaleronitrile), 2,2'-azobis(2-methylvaleronitrile), 2,2'-azobis(2-cyclopropylpropionitrile), dimethyl 2,2'-azobisisobutyrate, 2,2'-azobis[2-(hydroxymethyl)propionitrile], and 4,4'-azobis (4-cyanopentanoic acid).

The amounts of the structural units of the fluorocopolymer (I) are preferably in the following ranges.
Structural Unit (a):
The amount of the structural unit (a) is preferably 40 mol % or more and 50 mol % or less. If the amount thereof is less than 40 mol %, the properties of a fluororesin such as weather resistance are less likely to be imparted. The amount thereof is more preferably 42 to 50 mol %.
Structural Unit (b):
The amount of the structural unit (b) is preferably 20 mol % or more and 54.9 mol % or less. If the amount thereof is less than 20 mol %, the flexibility and contamination resistance tend to be poor, whereas if the amount thereof is more than 54.9 mol %, the properties of a fluororesin such as weather resistance tend to be lost. The amount thereof is more preferably 25 to 50 mol %.
Structural Unit (c):
The amount of the structural unit (c) is preferably 5 mol % or more and 14 mol % or less. If the amount thereof is less than 5 mol %, the solvent resistance of a coating tends to be poor, whereas if the amount thereof is more than 14 mol %, the flexibility of a coating tends to be poor. The amount thereof is more preferably 5 to 13 mol %.
Structural Unit (d):
The amount of the structural unit (d) is preferably 0.1 mol % or more and 5 mol % or less. If the amount thereof is less than 0.1 mol %, the pigment dispersibility tends to be poor, whereas if the amount thereof is more than 5 mol %, the water resistance tends to be poor. The amount thereof is more preferably 0.2 to 2.0 mol %.
Structural Unit (e):
The amount of the structural unit (e) is preferably 0 mol % or 25 mol % or less. In cases where the monomer (e) is the non-aromatic vinyl ester (e1) other than the vinyl acetate (b), such as vinyl versatate, the amount of the structural unit (e) is preferably less than 8 mol %.

The fluorocopolymer may include 40 mol % or more and 50 mol % or less of the structural unit (a), 20 mol % or more and 54.9 mol % or less of the structural unit (b), 5 mol % or more and 14 mol % or less of the structural unit (c), 0.1 mol % or more and 5 mol % or less of the structural unit (d), and 0 mol % or more and 25 mol % or less of the structural unit (e). Such a fluorocopolymer is a novel copolymer. The copolymer preferably has a number average molecular weight of 5,000 to 100,000.

The paint composition of the present invention is a solvent-based paint composition that includes a specific fluorocopolymer (I) and a specific organic solvent (II). Further, the paint composition may be in the form of such as a curable composition that contains a curing agent.

The paint composition of the present invention eases limitations on the types and conditions of the solvent to be used. Examples of the suitable organic solvent (II) include: esters such as ethyl acetate, butyl acetate, isopropyl acetate, isobutyl acetate, cellosolve acetate, and propylene glycol methyl ether acetate; ketones such as acetone, methyl ethyl ketone, methyl isobutyl ketone, and cyclohexanone; cyclic ethers such as tetrahydrofuran and dioxane; amides such as N,N-dimethylformamide and N,N-dimethylacetamide; aromatic hydrocarbons such as toluene and xylene; alcohols such as propylene glycol methyl ether; hydrocarbons such as hexane and heptane; and mixed solvents thereof. In cases where the organic solvent is used, the concentration of the fluorocopolymer is set at 5 to 95% by mass, and preferably set at 10 to 70% by mass.

In the paint composition of the present invention, the fluorocopolymer of the present invention may be blended with one or two or more resins. Examples of the resin(s) include, but are not limited to, organic resins such as (meth)acrylic resins which may contain styrene, polyester resins, alkyd resins, melamine-formaldehyde resins, polyisocyanate resins, epoxy resins, vinyl chloride resins (for example, vinyl chloride-vinyl acetate copolymer), ketone resins, petroleum resins, and chlorinated polyolefins such as polyethylene and polypropylene; inorganic resins such as silica gel and silicic acid; and fluororesins other than the fluorocopolymer of the present invention (for example, a homopolymer of tetrafluoroethylene or chlorotrifluoroethylene, or a copolymer of such a monomer with another monomer). The amount of the resin(s) to be blended is 900 parts by mass or less, and preferably 500 parts by mass or less, based on 100 parts by mass of the fluorocopolymer of the present invention. The lower limit of the amount of the resin(s) is set at an amount such that target properties are provided, and is determined by the type of the resin(s). In cases where the acrylic polymer is used, the amount thereof is usually 5 parts by mass or more, and preferably 10 parts by mass or more.

These listed resins are preferably used in admixture with an acrylic polymer which has excellent compatibility with the fluorocopolymer, and such a mixture provides a coating having high gloss, high hardness, and good appearance.

The acrylic polymer may be one conventionally used for a coating material. Specifically, the acrylic polymer may preferably be an acrylic polymer (i) such as a homopolymer or copolymer of a C1-C10 alkyl ester of (meth)acrylic acid or an acrylic copolymer (ii) such as a (meth)acrylic ester copolymer containing a curable functional group at a side chain and/or a main chain terminal.

Examples of the acrylic polymer (i) include homopolymers and copolymers of monomers such as methyl (meth)acrylate, ethyl (meth)acrylate, n-butyl (meth)acrylate, isobutyl(meth)acrylate, 2-ethylhexyl(meth)acrylate, and cyclohexyl(meth)acrylate, and copolymers of these monomers with an ethylenically unsaturated monomer.

In cases where a weak solvent is used as the polymerization solvent, the acrylic polymer is preferably a homopolymer or copolymer of monomers such as isobutyl(meth)acrylate, 2-ethylhexyl(meth)acrylate, and cyclohexyl(meth)acrylate; or a copolymer of these monomers with an ethylenically unsaturated monomer copolymerizable therewith in terms of excellent solvent solubility, weather resistance, adhesion, and compatibility with a fluororesin. Particularly, in terms of excellent solvent solubility, weather resistance, adhesion, compatibility with a fluororesin, chemical resistance, and water resistance, homopolymers and copolymers of monomers such as cyclohexyl(meth)acrylate, or copolymers of these monomers with an ethylenically unsaturated monomer are preferable.

The "weak solvent" herein refers to third-class organic solvents according to Industrial Safety and Health Act and solvents equivalent to these solvents. Particularly, a weak solvent containing an aliphatic hydrocarbon solvent and further 50% by mass or less of an aromatic hydrocarbon solvent is preferred. This is because such a weak solvent is much safe for the human body and environment, and is less likely to affect a base coating or a previous coating during coating operation, that is, less likely to cause a phenomenon such as lifting or shrinkage. The aliphatic hydrocarbon solvent and the aromatic hydrocarbon solvent are the same as those listed as the polymerization solvent. The weak solvent is commercially available, and examples thereof include SW#310 (trade name, produced by Maruzen Petrochemical Co., Ltd.), HAWS and LAWS (trade name, both produced by Shell Chemicals Japan Ltd.), A-Solvent (trade name, produced by NIPPON OIL CORPORATION), Exxon Naphtha No. 6, Exxon Naphtha No. 5, Exxon Naphtha No. 3, Exxsol D40, and Exxsol D80 (trade name, all produced by Exxon Chemical Company), Isopar E and Isopar G (trade name, both produced by NIPPON OIL CORPORATION), and IP SOLVENT 1620 and IP SOLVENT 2028 (trade name, both produced by Idemitsu Kosan Co., Ltd.).

Examples of the ethylenically unsaturated monomer include aromatic group-containing (meth)acrylates; (meth)acrylates containing a fluorine atom or a chlorine atom at the α position; fluoroalkyl(meth)acrylates in which an alkyl group is replaced by a fluorine atom; vinyl ethers; vinyl esters; aromatic vinyl monomers such as styrene; olefins such as ethylene, propylene, isobutylene, vinyl chloride, and vinylidene chloride; fumaric acid diesters, maleic acid diesters, and (meth)acrylonitrile.

Examples of the acrylic copolymer (ii) include copolymers of monomers that give the above-described acrylic polymer (i) with curable functional group-containing monomers. The curable functional group-containing monomers may contain a hydroxyl group, a carboxyl group, an epoxy group, or an amino group. Specific examples of the acrylic copolymer (ii) include, but are not limited to, a copolymer of the C1-C10 alkyl ester of the (meth)acrylic acid with a curable functional group-containing monomer such as hydroxyethyl(meth)acrylate, 2-hydroxypropyl(meth)acrylate, 2-hydroxyethyl vinyl ether, (meth)acrylic acid, glycidyl (meth)acrylate, 2-aminoethyl(meth)acrylate, and 2-aminopropyl(meth)acrylate; and copolymers of these monomers with the ethylenically unsaturated monomer.

In the case of the copolymers (i) and (ii) of the C1-C10 alkyl ester of (meth)acrylic acid, the amount of the C1-C10 alkyl ester of the (meth)acrylic acid is 5% by mass or more, and preferably 10% by mass or more in terms of excellent properties such as solvent solubility, weather resistance, water resistance, chemical resistance, and compatibility with a fluororesin. Further, the amount is preferably 98% by mass or less, and particularly preferably 96% by mass or less in terms of excellent properties such as adhesion, weather resistance, and chemical resistance. Particularly, in cases where cyclohexyl(meth)acrylate is used as the C1-C10 alkyl ester of (meth)acrylic acid, the amount of the cyclohexyl (meth)acrylate is 5% by mass or more, and preferably 10% by mass or more in terms of excellent solvent solubility, weather resistance, adhesion, compatibility with a fluororesin, water resistance, and chemical resistance. Further, the amount thereof is preferably 90% by mass or less, and particularly preferably 80% by mass or less in terms of good properties such as compatibility with a fluororesin and flexibility. In this case, in terms of excellent properties such as solvent solubility, chemical resistance, and adhesion, the ethylenically unsaturated monomer is preferably, for example, an aromatic group-containing (meth)acrylate, a (meth)acrylate containing a fluorine atom or a chlorine atom at the α position, a fluoroalkyl(meth)acrylate in which an alkyl group is replaced by a fluorine atom; a vinyl ether; a vinyl ester; an aromatic vinyl monomer such as styrene; an olefin such as ethylene, propylene, isobutylene, vinyl chloride, or vinylidene chloride; a fumaric acid diester, a maleic acid diester, or (meth)acrylonitrile. The curable functional group-containing monomer may contain, for example, a hydroxyl group, a carboxyl group, an epoxy group, or an amino group, in terms of excellent properties such as adhesion, chemical resistance, and curability. Specific preferred examples of the curable functional group-containing monomer include hydroxyethyl(meth)acrylate, 2-hydroxy propyl (meth)acrylate, 2-hydroxy ethyl vinyl ether, (meth)acrylic acid, glycidyl(meth)acrylate, 2-amino ethyl (meth)acrylate, and 2-amino propyl(meth)acrylate. The amount of the curable functional group-containing monomer is 50% by mass or less and preferably 40% by mass or less in terms of excellent properties such as water resistance, solvent solubility, chemical resistance, weather resistance, compatibility with a fluororesin, and adhesion, whereas the amount thereof is 2% by mass or more and preferably 4% by mass or more in terms of good properties such as water resistance, chemical resistance, adhesion, and weather resistance.

The acrylic polymer (i) is commercially available and examples thereof include Hitaloid 1005, Hitaloid 1206, Hitaloid 2330-60, Hitaloid 4001, and Hitaloid 1628A (trade name, all produced by Hitachi Chemical Co., Ltd.); Dianal LR-1065 and Dianal LR-90 (trade name, both produced by MITSUBISHI RAYON CO., LTD.); PARALOID B-44, PARALOID A-21, and PARALOID B-82 (trade name, all produced by Rohm and Haas Company); and ELVACITE 2000 (trade name, produced by E.I. du Pont de Nemours).

The acrylic copolymer (ii) is commercially available and examples thereof include Hitaloid 3004, Hitaloid 3018, Hitaloid 3046C, Hitaloid 6500B, and Hitaloid 6500 (all produced by Hitachi Chemical Co., Ltd.); ACRYDIC A810-45, ACRYDIC A814, and ACRYDIC 47-540 (trade name, all produced by DIC Corporation); Dianal LR-620, Dianal SS-1084, and Dianal SS-792 (trade name, all produced by MITSUBISHI RAYON CO., LTD.); OLESTER Q166 and OLESTER Q185 (trade name, all produced by Mitsui Toatsu Chemicals, Inc.); and HARIACRON 8360G-55, HARIACRON 8360HS-130, and HARIACRON 8160 (trade name, all produced by Harima Chemicals Group, Inc.).

The number average molecular weight of the acrylic polymer measured by GPC is preferably 1,000 to 200,000, and more preferably 2,000 to 100,000. Too large a number average molecular weight tends to cause poor solvent solubility, whereas too small a number average molecular weight tends to cause a problem with weather resistance.

The paint composition of the present invention may be a curable paint composition containing a curing agent. The curing agent to be used may be formed into a compound capable of reacting and crosslinking with a curing reactive group of the fluorocopolymer. Commonly used are, for example, isocyanates, amino resins, acid anhydrides, polyepoxy compounds, and isocyanate group-containing silane compounds.

Specific examples of the isocyanates include, but are not limited to, 2,4-tolylene diisocyanate, diphenylmethane-4,4'-diisocyanate, xylylene diisocyanate, isophorone diisocyanate, lysine methyl ester diisocyanate, methylcyclohexyl diisocyanate, trimethyl hexamethylene diisocyanate, hexamethylene diisocyanate, n-pentane-1,4-diisocyanate, trimers thereof, adduct forms thereof, biuret forms thereof, polymers thereof having two or more isocyanate groups, and further blocked isocyanates.

Specific examples of the amino resins may include, but are not limited to, urea resin, melamine resin, benzoguanamine resin, glycoluril resin, methylolated melamine resin obtained by methylolating melamine, and alkyl etherified melamine resin obtained by etherifying methylolated melamine with alcohols such as methanol, ethanol, and butanol.

Specific examples of the acid anhydrides include, but are not limited to, phthalic anhydride, pyromellitic anhydride, and mellitic anhydride.

The polyepoxy compounds and isocyanate group-containing silane compounds to be used may be those described in JP-A H2-232250, JP-A H2-232251, or the like. Preferred examples thereof are described below.

[Chem. 1]

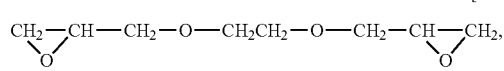

-continued

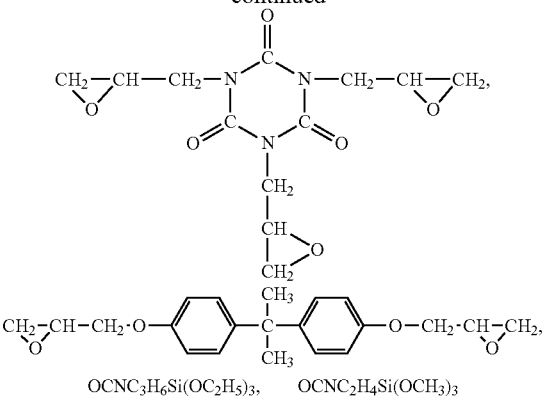

The amount of the curing agent is 0.1 to 5 equivalents, and preferably 0.5 to 1.5 equivalents per equivalent of a chemically curing reactive group in the fluorocopolymer. The composition of the present invention can generally be cured for several minutes to about 10 days at 0 to 200° C.

Various additives may be further added to the curable composition. Examples of the additives include curing accelerators, pigments, pigment dispersants, leveling agents, defoaming agents, antigelling agents, ultraviolet absorbers, antioxidants, and hydrophilizing agents.

Examples of the curing accelerators include organotin compounds, acid phosphate esters, reaction products of acid phosphate esters with amines, saturated or unsaturated polycarboxylic acids and acid anhydrides thereof, organic titanate compounds, amine compounds, and lead octylate.

Specific examples of the organotin compounds include dibutyltin dilaurate, dibutyltin maleate, dioctyltin maleate, dibutyltin diacetate, dibutyltin phthalate, tin octylate, tin naphthenate, and dibutyltin methoxide.

Further, the acid phosphate esters are a phosphate ester containing a moiety represented by the following formula:

[Chem. 2]

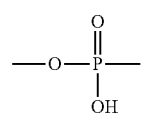

and examples thereof include organic acid phosphate esters represented by the following formula:

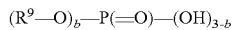

wherein b represents 1 or 2, and $R^9$ represents an organic residue.

Specific examples of the acid phosphate esters include the compounds represented by the following formulas,

[Chem. 3]

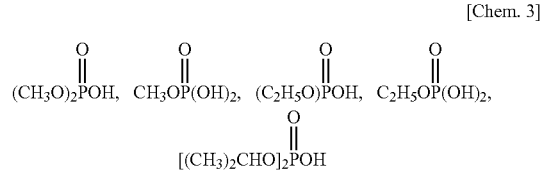

Examples of the organic titanate compounds include titanic acid esters such as tetrabutyl titanate, tetraisopropyl titanate, and triethanolamine titanate.

Further, specific examples of the amine compounds include: amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylene diamine, triethylenediamine, guanidine, diphenyl guanidine, 2,4,6-tris(dimethylaminomethyl)phenol, morpholine, N-methylmorpholine, and 1,8-diazabicyclo (5.4.0)undecene-7 (DBU), salts thereof with carboxylic acid, low-molecular-weight polyamide resins resulting from excess polyamines and polybasic acids, and reaction products of excess polyamines and epoxy compounds.

The curing accelerators may be used alone or two or more of the curing accelerators may be used in combination. The amount of the curing accelerator is preferably about $1.0 \times 10^{-6}$ to $1.0 \times 10^{-2}$ parts by mass, and more preferably $5.0 \times 10^{-5}$ to $1.0 \times 10^{-3}$ parts by mass based on 100 parts by mass of the copolymer.

Specific examples of the pigments include, but are not limited to, inorganic pigments such as titanium oxide, calcium carbonate, and carbon black; and organic pigments such as phthalocyanine pigments, quinacridone pigments, and azo pigments. The amount of the pigment is usually up to about 200 parts by mass based on 100 parts by mass of the copolymer.

The hydrophilizing agents to be used may be methyl silicate, ethyl silicate, fluoroalkyl silicate, and condensates thereof. The hydrophilizing agents are commercially available and examples thereof include ET40 and ET48 (produced by COLCOAT CO., LTD.); MS56, MS56S, and MS57 (produced by Mitsubishi Chemical Corporation); and GH700 and GH701 (produced by DAIKIN INDUSTRIES, LTD.).

Examples of the solvent include, but are not limited to, aromatic hydrocarbon solvents such as xylene, toluene, and solvent naphtha; aliphatic hydrocarbon solvents such as n-hexane, n-pentane, n-octane, n-nonane, n-decane, n-undecane, n-dodecane, and mineral spirits; ester solvents such as ethyl acetate and butyl acetate; ketone solvents such as methyl isobutyl ketone; glycol ether solvents such as ethyl cellosolve; and diethylene glycol ester solvents such as carbitol acetate.

The curable paint composition of the present invention has excellent solvent solubility, and a coating resulting from the composition has high weather resistance and excellent contamination resistance, chemical resistance, optical properties, mechanical properties, adhesion to a base, and thermal yellowing resistance. The curable paint composition can be used as a coating material like a common curable composition, specifically, can be used as an interior coating material for building materials or interior materials, or used as an exterior coating material for building materials, cars, planes, ships, and trains. The coating materials may be directly applied on a base made of metal, concrete, plastic, or the like; or may be applied on an undercoating material such as a wash primer, a rust preventive coating material, an epoxy coating material, an acrylic resin coating material, a polyester resin coating material, or the like. Further, the curable paint composition can be used as a sealing agent or a film forming agent.

The present invention can provide a coating with a structure in which a cured coating of the curable composition of the present invention is formed on a base as the outermost layer. The cured coating of the curable composition of the present invention may be directly formed on a base, or may be a layer formed on a primer, or if needed, on an undercoating layer. The thickness of the cured coating, which is the outermost layer, is usually 10 to 100 µm, and preferably 20 to 50 µm.

The primer to be used may be a known primer for a fluororesin coating material, and examples of the primer include epoxy primers and zinc-rich primers.

The undercoating layer to be used may also be a known primer for a fluororesin coating material, and examples of a coating material for the undercoating layer include acrylic coating materials, urethane coating materials, polyester coating materials, and epoxy coating materials.

The kind of the base depends on an object to be coated, and examples of the base include stone, wood, and paper, in addition to metal, concrete, and plastic.

EXAMPLES

The present invention is described referring to examples in more detail below.

The physical properties described in this specification are measured by the following measurement methods.

(1) Elemental Analysis (Measurement of Fluorine Content (% by Mass))

Measurement device: Automatic quick furnace (AQF-100, produced by Mitsubishi Chemical Corporation) provided with an ion chromatograph (ICS-1500 Ion Chromatography System, produced by Dionex Corporation)

Sample: 3 mg (2) IR Analysis

Fourier-transform infrared spectrometer: Perkin Elmer precisely Spectrum 100 (produced by Perkin-Elmer)

FT-IR Spectrometer

Single reflection

IRE: Germanium

Angle of incidence: 45 degrees (3) Number Average Molecular Weight

Measurement device: Shodex GPC-104 (produced by Showa Denko K. K.)

Measurement condition: Tetrahydrofuran was used as an eluent, and polystyrene with a known molecular weight was used as a standard sample for molecular weight determination.

(4) Glass Transition Temperature

In accordance with ASTM E1356-98, a glass transition temperature and a crystalline melting point were determined from heat absorption in a second run by a midpoint method, using a DSC measurement device produced by Metler-Toledo International Inc.

Measurement Conditions

Rate of temperature rise: 20° C./min

Amount of sample: 10 mg

Heat cycle: −50° C. to 150° C., heating, cooling, and heating (5) Elastic Modulus and Elongation at Break The rectangular sample film was cut to a size of 10 mm×60 mm, and measured for elastic modulus and elongation at break using Tensilon universal testing machine (produced by Orientec Co., Ltd.) in the conditions of a chuck distance of 40 mm and a crosshead speed of 50 mm/min.

(6) Contamination Resistance

An area of 10 mm×10 mm of a coating was painted with a red ink using a felt-tip pen (SAKURA PEN TOUCH, trade name, produced by SAKURA COLOR PRODUCTS CORP.), and allowed to stand for 1 hour at room temperature. Then, the red ink was wiped with ethanol, and the left red ink was visually observed. The evaluation was performed using the following criteria.
A: Completely wiped
B: Slightly left
C: Partly left
D: Remarkably left Example 1 (Production of Fluorocopolymer 1)

A 3-L stainless steel autoclave was purged with nitrogen, and to the autoclave was added butyl acetate (1,200 g), vinyl acetate (116.4 g), 4-hydroxybutyl vinyl ether (HBVE) (31.1 g), and undecylenic acid (2.7 g). Then, tetrafluoroethylene (200 g) was added thereto and the temperature in the autoclave was raised to 60° C. Perbutyl PV (radical polymerization initiator, produced by NOF Corp.) (6.3 g) was added to the autoclave with stirring to start the reaction. The temperature in the autoclave was raised to 75° C. at 3 hours after the start of the polymerization, and the temperature and pressure therein were lowered to ordinary temperature and pressure at 4 hours after the start of the polymerization. Then, the polymerization was stopped. Thus, a butyl acetate solution (1,500 g) of a fluorocopolymer (solids concentration of 20.0% by mass) was prepared.

The properties of the resulting fluorocopolymer (hereinafter, referred to as "fluorocopolymer 1") were as follows: number average molecular weight (Mn) 29,000; glass transition temperature (Tg) 23° C.; fluorine content 37.5% by mass; hydroxyl value 52 mgKOH/g; and acid value 2.9 mgKOH/g. FIG. 1 shows the IR chart.

Example 2 (Production of Fluorocopolymer 2)

A 3-L stainless steel autoclave was purged with nitrogen, and to the autoclave was added butyl acetate (1,200 g), vinyl acetate (190.5 g), 4-hydroxybutyl vinyl ether (HBVE) (28.3 g), and undecylenic acid (3.7 g). Then, tetrafluoroethylene (200 g) was added thereto and the temperature in the autoclave was raised to 60° C. Perbutyl PV (radical polymerization initiator, produced by NOF Corp.) (6.3 g) was added to the autoclave with stirring to start the reaction. The temperature in the autoclave was raised to 75° C. at 3 hours after the start of the polymerization, and the temperature and pressure therein were lowered to ordinary temperature and pressure at 4 hours after the start of the polymerization. Then, the polymerization was stopped. Thus, a butyl acetate solution (1,600 g) of a fluorocopolymer (solids concentration of 24.0% by mass) was prepared.

Figure 2:
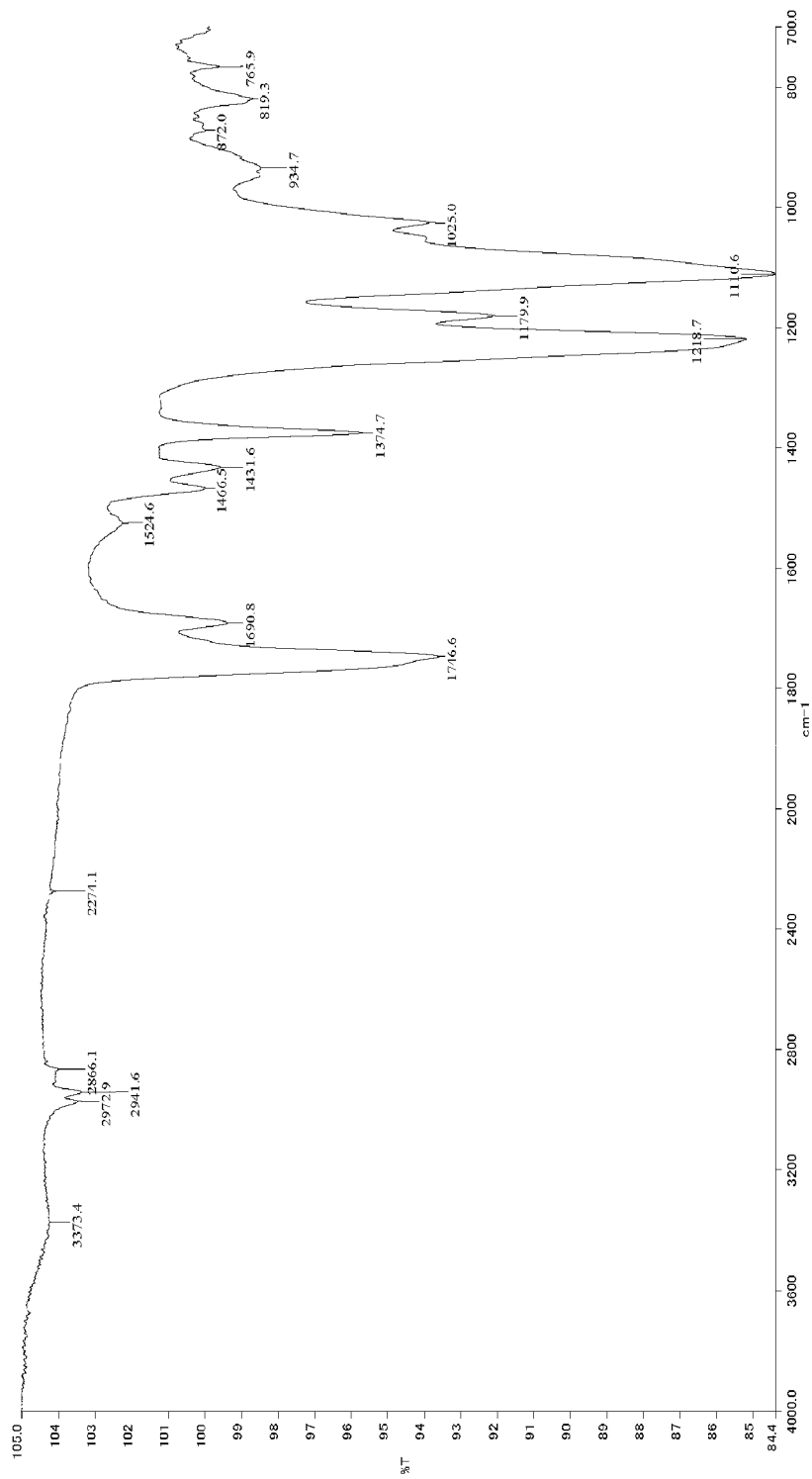
FIG. 2 is an IR chart of a fluorocopolymer produced in Example 2.

The properties of the resulting fluorocopolymer (hereinafter, referred to as "fluorocopolymer 2") were as follows: number average molecular weight (Mn) 31,000; glass transition temperature (Tg) 28° C.; fluorine content 33.3% by mass; hydroxyl value 32 mgKOH/g; and acid value 2.4 mgKOH/g. FIG. 2 shows the IR chart.

Example 3 (Production of Fluorocopolymer 3)

A 3-L stainless steel autoclave was purged with nitrogen, and to the autoclave was added butyl acetate (1,000 g), vinyl acetate (98.0 g), 4-hydroxybutyl vinyl ether (HBVE) (27.6 g), and undecylenic acid (2.8 g). Then, chlorotrifluoroethylene (200 g) was added thereto and the temperature in the autoclave was raised to 60° C. Perbutyl PV (radical polymerization initiator, produced by NOF Corp.) (4.8 g) was added to the autoclave with stirring to start the reaction. Perbutyl PV (2.4 g) was added at 4 hours after the start of the polymerization and the temperature in the autoclave was raised to 75° C., and the temperature and pressure therein were lowered to ordinary temperature and pressure at 6 hours after the start of the polymerization. Then, the polymerization was stopped. Thus, a butyl acetate solution (1325 g) of a fluorocopolymer (solids concentration of 20.4% by mass) was prepared.

Figure 3:
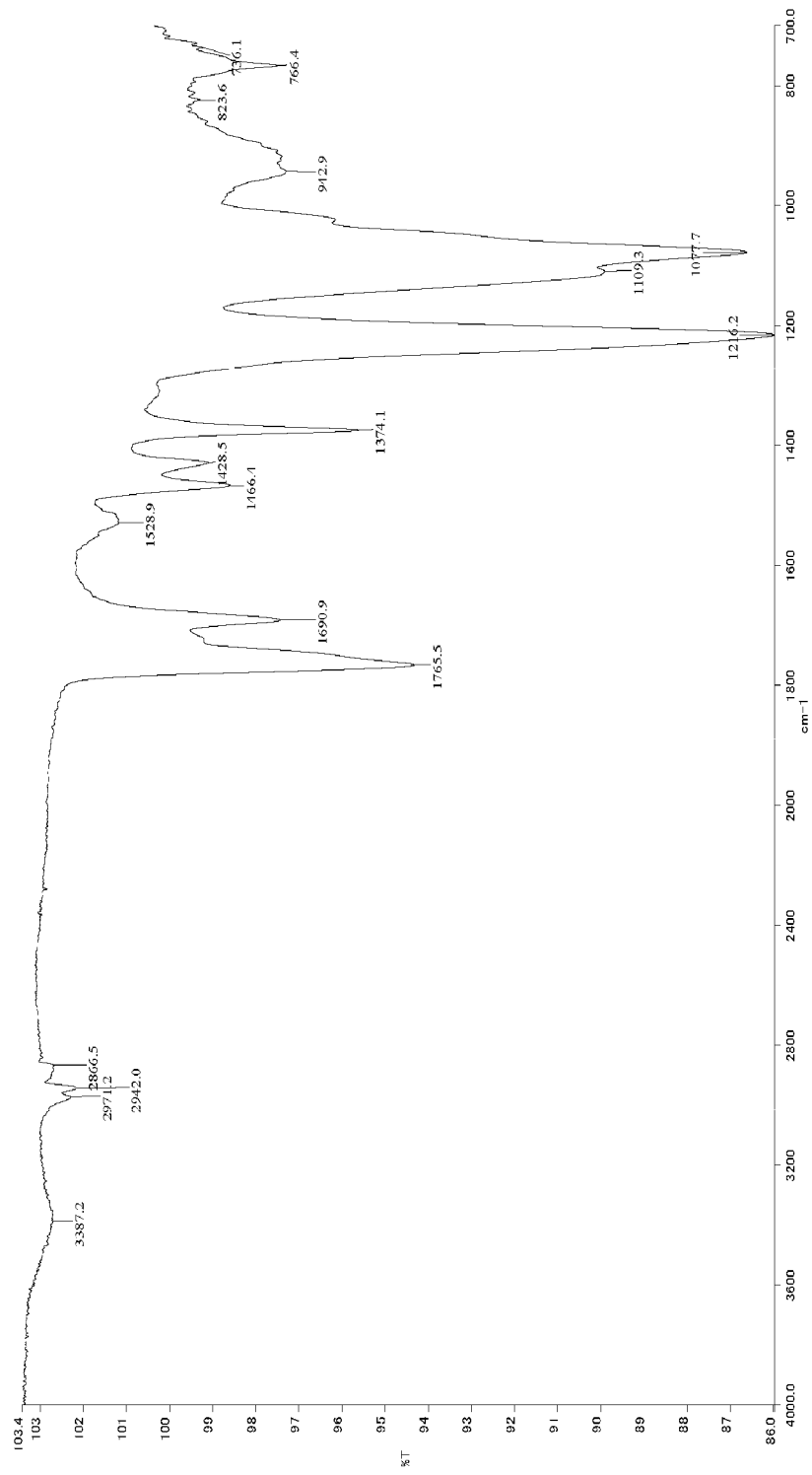
FIG. 3 is an IR chart of a fluorocopolymer produced in Example 3.

The properties of the resulting fluorocopolymer (hereinafter, referred to as "fluorocopolymer 3") were as follows: number average molecular weight (Mn) 9,500; glass transition temperature (Tg) 39° C.; fluorine content 26.2% by mass; hydroxyl value 50 mgKOH/g; and acid value 3.2 mgKOH/g. FIG. 3 shows the IR chart.

Example 4 (Production of Fluorocopolymer 4)

A 3-L stainless steel autoclave was purged with nitrogen, and to the autoclave was added butyl acetate (949 g), vinyl acetate (204 g), 4-hydroxybutyl vinyl ether (HBVE) (40.7 g), and undecylenic acid (10.2 g). Then, tetrafluoroethylene (140 g) was added thereto and the temperature in the autoclave was raised to 60° C. Perbutyl PV (radical polymerization initiator, produced by NOF Corp.) (3.8 g) was added to the autoclave with stirring to start the reaction. Perbutyl PV (1.3 g) was added at 4 hours after the start of the polymerization and the temperature in the autoclave was raised to 75° C., and the temperature and pressure therein were lowered to ordinary temperature and pressure at 5 hours after the start of the polymerization. Then, the polymerization was stopped. Thus, a butyl acetate solution (1396 g) of a fluorocopolymer (solids concentration of 32% by mass) was prepared.

The properties of the resulting fluorocopolymer (hereinafter, referred to as "fluorocopolymer 4") were as follows: number average molecular weight (Mn) 17,000; glass transition temperature (Tg) 28° C.; fluorine content 38.4% by mass; hydroxyl value 36.8 mgKOH/g; and acid value 5.8 mgKOH/g.

Example 5 (Production of Fluorocopolymer 5)

A 6-L stainless steel autoclave was purged with nitrogen, and to the autoclave was added butyl acetate (2,847 g), vinyl acetate (212.9 g), 4-hydroxybutyl vinyl ether (HBVE) (144.2 g), undecylenic acid (14.7 g), and vinyl versatate (Veova10, produced by Momentive Specialty Chemicals) (490.2 g). Then, tetrafluoroethylene (643 g) was added thereto and the temperature in the autoclave was raised to 60° C. Perbutyl PV (radical polymerization initiator, produced by NOF Corp.) (11.5 g) was added to the autoclave with stirring to start the reaction. Perbutyl PV (3.8 g) was added at 5 hours after the start of the polymerization and the temperature in the autoclave was raised to 75° C., and the temperature and pressure therein were lowered to ordinary temperature and pressure at 6 hours after the start of the polymerization. Then, the polymerization was stopped. Thus, a butyl acetate solution (4246 g) of a fluorocopolymer (solids concentration of 31.2% by mass) was prepared.

The properties of the resulting fluorocopolymer (hereinafter, referred to as "fluorocopolymer 5") were as follows: number average molecular weight (Mn) 18,000; glass transition temperature (Tg) 15° C.; fluorine content 29.5% by mass; hydroxyl value 51 mgKOH/g; and acid value 3.3 mgKOH/g.

Example 6 (Production of Fluorocopolymer 6)

A 6-L stainless steel autoclave was purged with nitrogen, and to the autoclave was added butyl acetate (2.847 g), vinyl acetate (376.6 g), 4-hydroxybutyl vinyl ether (HBVE) (153.3 g), undecylenic acid (15.2 g), and vinyl versatate (Veova10, produced by Momentive Specialty Chemicals) (272.6 g). Then, tetrafluoroethylene (718 g) was added thereto and the temperature in the autoclave was raised to 60° C. Perbutyl PV (radical polymerization initiator, produced by NOF Corp.) (11.5 g) was added to the autoclave with stirring to start the reaction. Perbutyl PV (3.8 g) was added at 5 hours after the start of the polymerization and the temperature in the autoclave was raised to 75° C., and the temperature and pressure therein were lowered to ordinary temperature and pressure at 6 hours after the start of the polymerization. Then, the polymerization was stopped. Thus, a butyl acetate solution (4281 g) of a fluorocopolymer (solids concentration of 33.1% by mass) was prepared.

The properties of the resulting fluorocopolymer (hereinafter, referred to as "fluorocopolymer 6") were as follows: number average molecular weight (Mn) 20,000; glass transition temperature (Tg) 16° C.; fluorine content 33.1% by mass; hydroxyl value 50 mgKOH/g; and acid value 3.1 mgKOH/g.

Example 7 (Production of Fluorocopolymer 7)

A 6-L stainless steel autoclave was purged with nitrogen, and to the autoclave was added butyl acetate (2,847 g), vinyl acetate (475 g), 4-hydroxybutyl vinyl ether (HBVE) (158.4 g), undecylenic acid (16.3 g), and vinyl versatate (Veova10, produced by Momentive Specialty Chemicals) (147 g). Then, tetrafluoroethylene (762 g) was added thereto and the temperature in the autoclave was raised to 60° C. Perbutyl PV (radical polymerization initiator, produced by NOF Corp.) (11.5 g) was added to the autoclave with stirring to start the reaction. Perbutyl PV (3.8 g) was added at 4.5 hours after the start of the polymerization and the temperature in the autoclave was raised to 75° C., and the temperature and pressure therein were lowered to ordinary temperature and pressure at 5.5 hours after the start of the polymerization. Then, the polymerization was stopped. Thus, a butyl acetate solution (4,340 g) of a fluorocopolymer (solids concentration of 33.1% by mass) was prepared.

The properties of the resulting fluorocopolymer (hereinafter, referred to as "fluorocopolymer 7") were as follows: number average molecular weight (Mn) 23,000; glass transition temperature (Tg) 22° C.; fluorine content 35% by mass; hydroxyl value 51 mgKOH/g; and acid value 3.3 mgKOH/g.

Comparative Example 1 (Production of Fluorocopolymer 8)

A 3-L stainless steel autoclave was purged with nitrogen, and to the autoclave was added butyl acetate (1,000 g), cyclohexyl vinyl ether (164.6 g), 4-hydroxybutyl vinyl ether (HBVE) (36.2 g), and undecylenic acid (3.3 g). Then, tetrafluoroethylene (200 g) was added thereto and the temperature in the autoclave was raised to 60° C. Perbutyl PV (radical polymerization initiator, produced by NOF Corp.) (4.8 g) was added to the autoclave with stirring to start the reaction. The temperature in the autoclave was raised to 75° C. at 3 hours after the start of the polymerization, and the temperature and pressure therein were lowered to ordinary temperature and pressure at 6 hours after the start of the polymerization. Then, the polymerization was stopped. Thus, a butyl acetate solution (1,390 g) of a fluorocopolymer (solids concentration of 26.7% by mass) was prepared.

Figure 4:
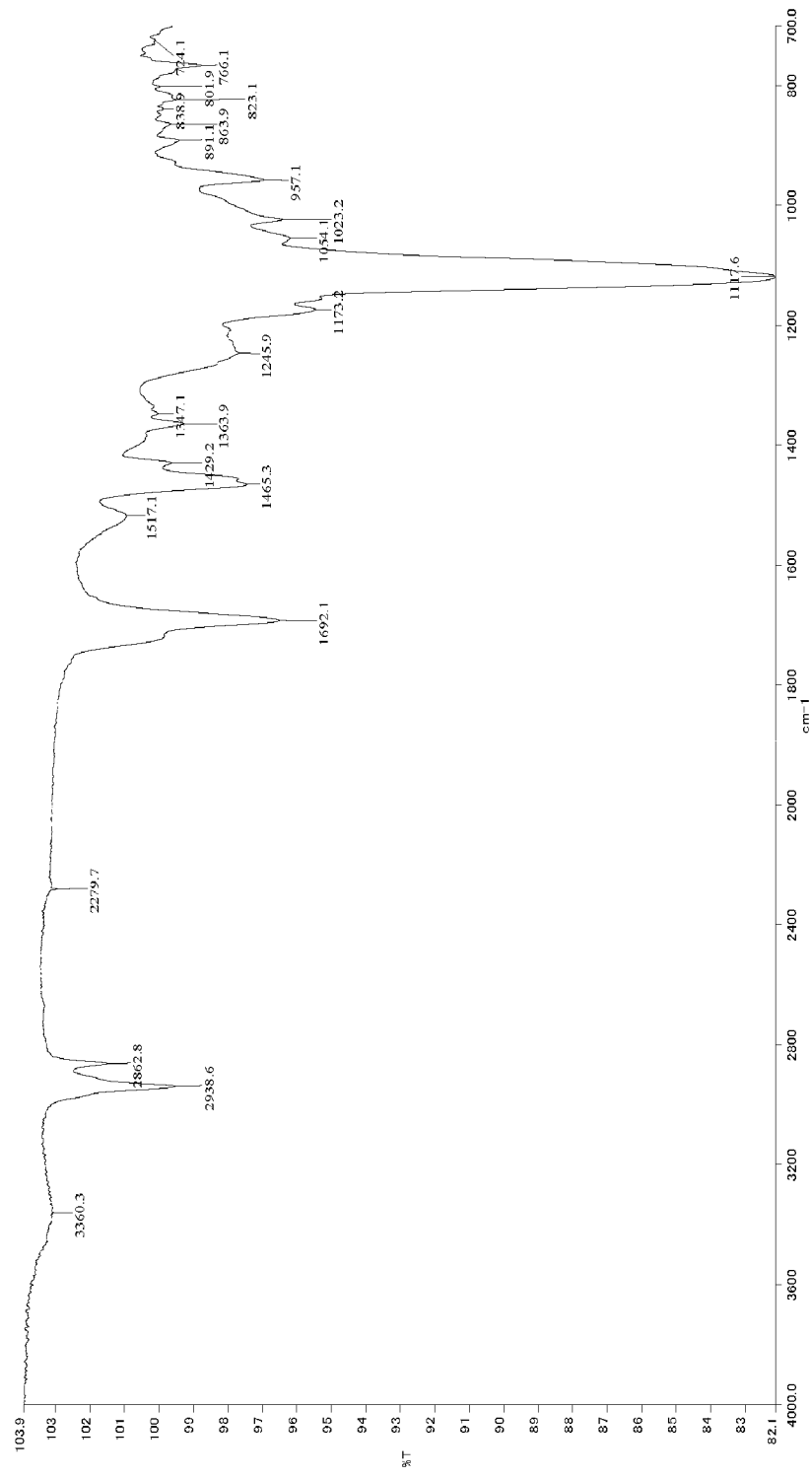
FIG. 4 is an IR chart of a fluorocopolymer produced in Comparative Example 1.

The properties of the resulting fluorocopolymer (hereinafter, referred to as "fluorocopolymer 8") were as follows: number average molecular weight (Mn) 28,000; glass transition temperature (Tg) 35° C.; fluorine content 36.0% by mass; hydroxyl value 52 mgKOH/g; and acid value 3.0 mgKOH/g. FIG. 4 shows the IR chart.

Table 1 shows the measurement values of the fluorocopolymers 1 to 8, specifically, compositions (mol %), fluorine contents (% by mass), glass transition temperatures (Tg) determined by DSC, and number average molecular weights determined by GPC.

Monomers are abbreviated in Table 1 as follows.
TFE: tetrafluoroethylene
CTFE: chlorotrifluoroethylene
VAc: vinyl acetate
HBVE: 4-hydroxybutyl vinyl ether
UDA: undecylenic acid
Veova10: vinyl versatate (VeoVA 10, trade name of C10 aliphatic carboxylic acid vinyl ester, produced by Momentive Specialty Chemicals)
CHVE: cyclohexyl vinyl ether

TABLE 1

|  |  | Example | | | | | | | Comparative Example |
|---|---|---|---|---|---|---|---|---|---|
|  |  | 1 | 2 | 3 | 4 | 5 | 6 | 7 | 1 |
| Fluorocopolymer |  | 1 | 2 | 3 | 4 | 5 | 6 | 7 | 8 |
| Structural unit (mol %) |  |  |  |  |  |  |  |  |  |
| (a) | TFE | 45 | 44.7 |  | 50 | 45 | 48 | 48 | 45 |
|  | CTFE |  |  | 45 |  |  |  |  |  |
| (b) | VAc | 45.5 | 49.4 | 45 | 42.7 | 21.7 | 31.8 | 37.2 |  |
| (c) | HBVE | 9 | 5.5 | 9.4 | 6.3 | 10.9 | 9.6 | 9.2 | 10.5 |
| (d) | UDA | 0.5 | 0.4 | 0.6 | 1.0 | 0.7 | 0.6 | 0.6 | 0.6 |
| (e) | Veova10 |  |  |  |  | 21.7 | 10 | 5 |  |
|  | CHVE |  |  |  |  |  |  |  | 43.9 |
| Fluorine content (% by mass) |  | 37.5 | 33.3 | 26.2 | 38.4 | 29.5 | 33.1 | 35 | 36.0 |
| Tg (° C.) |  | 23 | 28 | 39 | 28 | 15 | 16 | 22 | 35 |
| Number average molecular weight |  | 29000 | 31000 | 9500 | 17000 | 18000 | 20000 | 23000 | 28000 |
| Hydroxyl value (mgKOH/g) |  | 52 | 32 | 50 | 36.8 | 51 | 50 | 51 | 52 |
| Acid value (mgKOH/g) |  | 2.9 | 2.4 | 3.2 | 5.8 | 3.3 | 3.1 | 3.3 | 3.0 |
| IR chart |  | FIG. 1 | FIG. 2 | FIG. 3 | — | — | — | — | FIG. 4 |

Experimental Examples 1 to 7 and Comparative Experimental Example 1 (Preparation and Evaluation of Paint Composition)

The concentration of the butyl acetate solution of the respective fluorocopolymers 1 to 3 and 8 was controlled to about 50% by mass. To the resulting solution was added Sumidur N3300 (OH group/NCO group=1/1) (produced by Sumika Bayer Urethane Co., Ltd.) as a curing agent and a butyl acetate solution of dibutyltin dilaurate diluted to 1% as a curing catalyst. Thereby, a curable composition was prepared. Curable compositions of the fluorocopolymers 4 to 7 were prepared without adding a curing catalyst. The resulting composition was applied to a base and dried at 40° C. for 1 week to form a clear coating.

The clear coating was subjected to a contamination resistance test. In addition, a clear film prepared by peeling the coating from the base was measured for elastic modulus and elongation at break. Table 2 shows the results.

TABLE 2

|  | Experimental Example | | | | | | | Comparative Experimental Example |
|---|---|---|---|---|---|---|---|---|
|  | 1 | 2 | 3 | 4 | 5 | 6 | 7 | 1 |
| Coating material composition | | | | | | | | |
| Dispersion of fluorocopolymer (part by mass) | 20 | 20 | 20 | 10 | 10 | 10 | 10 | 20 |
| (Solids content (% by mass)) | (51.1) | (46.0) | (48.0) | (50.0) | (49.7) | (50.9) | (50.2) | (53.4) |
| Sumidur N3300 (part by mass) | 1.85 | 1.03 | 1.67 | 0.63 | 0.87 | 0.88 | 0.88 | 1.90 |
| 1% Dibutyltin dilaurate (part by mass) | 0.10 | 0.09 | 0.10 | | | | | 0.10 |
| Property | | | | | | | | |
| Comtamination resistance | A | A | A | A | A | A | A | B |
| Elastic modulus (MPa) | 626.3 | 650.8 | 1113 | 658.5 | 319.5 | 456.8 | 407.8 | 979.7 |
| Elongation at break (%) | 45.4 | 67.4 | 31.2 | 71.6 | 53.4 | 63.9 | 44.2 | 4.0 |

The invention claimed is:

1. A solvent-based paint composition, comprising:
   5 to 95% by mass of a fluorocopolymer (I), and
   5 to 95% by mass of an organic solvent (II),
   the fluorocopolymer (I) including:
   a perhaloolefin structural unit (a) that contains two carbon atoms,
   a vinyl acetate structural unit (b),
   a hydroxyl group-containing vinyl monomer structural unit (c) represented by the following formula (1):

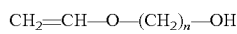
   $CH_2=CH-O-(CH_2)_n-OH$ wherein n is an integer of 2 or more, and
   a carboxyl group-containing monomer structural unit (d) represented by the following formula (2):

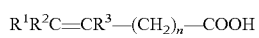
   $R^1R^2C=CR^3-(CH_2)_m-COOH$ wherein $R^1$, $R^2$, and $R^3$ are the same as or different from one another, and each represents a hydrogen atom or a $C_1$-$C_{10}$ linear or branched alkyl group; and m is an integer of 8 or more,
   wherein the fluorocopolymer (I) has an acid value of 1 to 9 mgKOH/g and a hydroxyl value of 20 to 65 mgKOH/g,
   wherein the hydroxyl group-containing vinyl monomer structural unit (c) is hydroxybutyl vinyl ether,
   wherein the carboxyl group-containing monomer structural unit (d) is undecylenic acid, and
   wherein the perhaloolefin structural unit (a) is tetrafluoroethylene or chlorotrifluoroethylene.

2. The solvent-based paint composition according to claim 1,
   wherein the fluorocopolymer includes 40 mol % or more and 50 mol % or less of the structural unit (a), 20 mol % or more and 54.9 mol % or less of the structural unit (b), 5 mol % or more and 14 mol % or less of the structural unit (c), and 0.1 mol % or more and 5 mol % or less of the structural unit (d), and further includes 0 mol % or more and 25 mol % or less of a monomer structural unit (e).

3. The solvent-based paint composition according to claim 1, wherein the fluorocopolymer (I) has an acid value of 1 to 5.8 mgKOH/g.

4. A fluorocopolymer, comprising:
   a perhaloolefin structural unit (a) that contains two carbon atoms;
   a vinyl acetate structural unit (b);
   a hydroxyl group-containing vinyl monomer structural unit (c) represented by the following formula (1):

$CH_2=CH-O-(CH_2)_n-OH$ wherein n is an integer of 2 or more;
   a carboxyl group-containing monomer structural unit (d) represented by the following formula (2):

$R^1R^2C=CR^3-(CH_2)_m-COOH$ wherein $R^1$, $R^2$, and $R^3$ are the same as or different from one another, and each represents a hydrogen atom or a $C_1$-$C_{10}$ linear or branched alkyl group; and m is an integer of 2 or more; and
   a monomer structural unit (e),
   wherein the fluorocopolymer contains 40 mol % or more and 50 mol % or less of the structural unit (a), 20 mol % or more and 54.9 mol % or less of the structural unit (b), 5 mol % or more and 14 mol % or less of the structural unit (c), 0.1 mol % or more and 5 mol % or less of the structural unit (d), and more than 0 mol % and 25 mol % or less of the structural unit (e),
   wherein the fluorocopolymer has an acid value of 1 to 9 mgKOH/g,
   wherein the fluorocopolymer has a hydroxyl value of 20 to 65 mgKOH/g,
   wherein the hydroxyl group-containing vinyl monomer structural unit (c) is hydroxyethyl vinyl ether or hydroxybutyl vinyl ether, wherein the carboxyl group-containing monomer structural unit (d) is pentenoic acid, hexenoic acid, heptenoic acid, octenoic acid, nonenoic acid, decenoic acid, undecylenic acid, dodecenoic acid, tridecenoic acid, tetradecenoic acid, pentadecenoic acid, hexadecenoic acid, heptadecenoic acid, octadecenoic acid, nonadecenoic acid, or eicosenoic acid, and wherein the monomer structural unit (e) is carboxylic acid vinyl esters with a carboxylic acid that contains 9 or more carbon atoms.

5. The fluorocopolymer according to claim 4,
wherein the copolymer has a number average molecular weight of 5,000 to 100,000.

6. The fluorocopolymer according to claim 4, having an acid value of 1 to 5.8 mgKOH/g.

* * * * *